Oct. 20, 1925.  1,558,018
H. M. LAMBERT
APPARATUS FOR MAKING CUSHION TIRES
Filed April 11, 1924  3 Sheets-Sheet 3
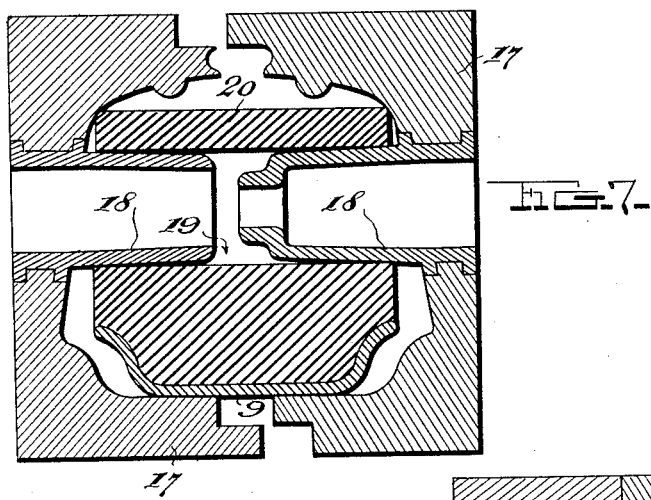
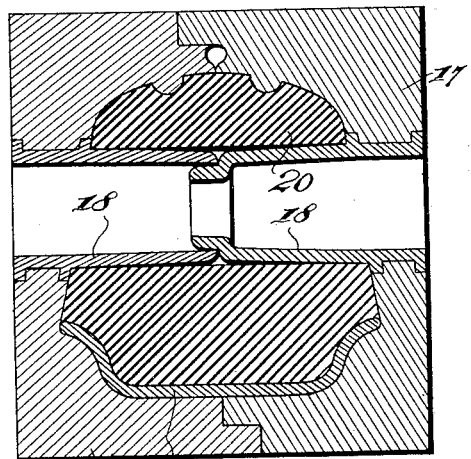
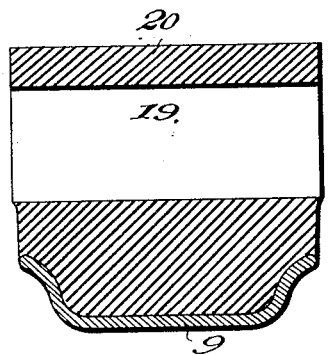
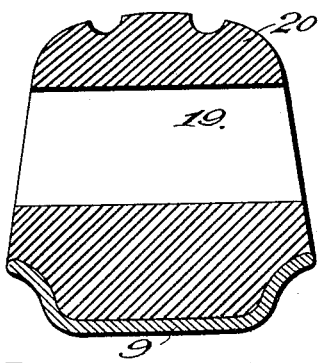
INVENTOR
H.M.LAMBERT.
BY
ATTORNEY Patented Oct. 20, 1925.

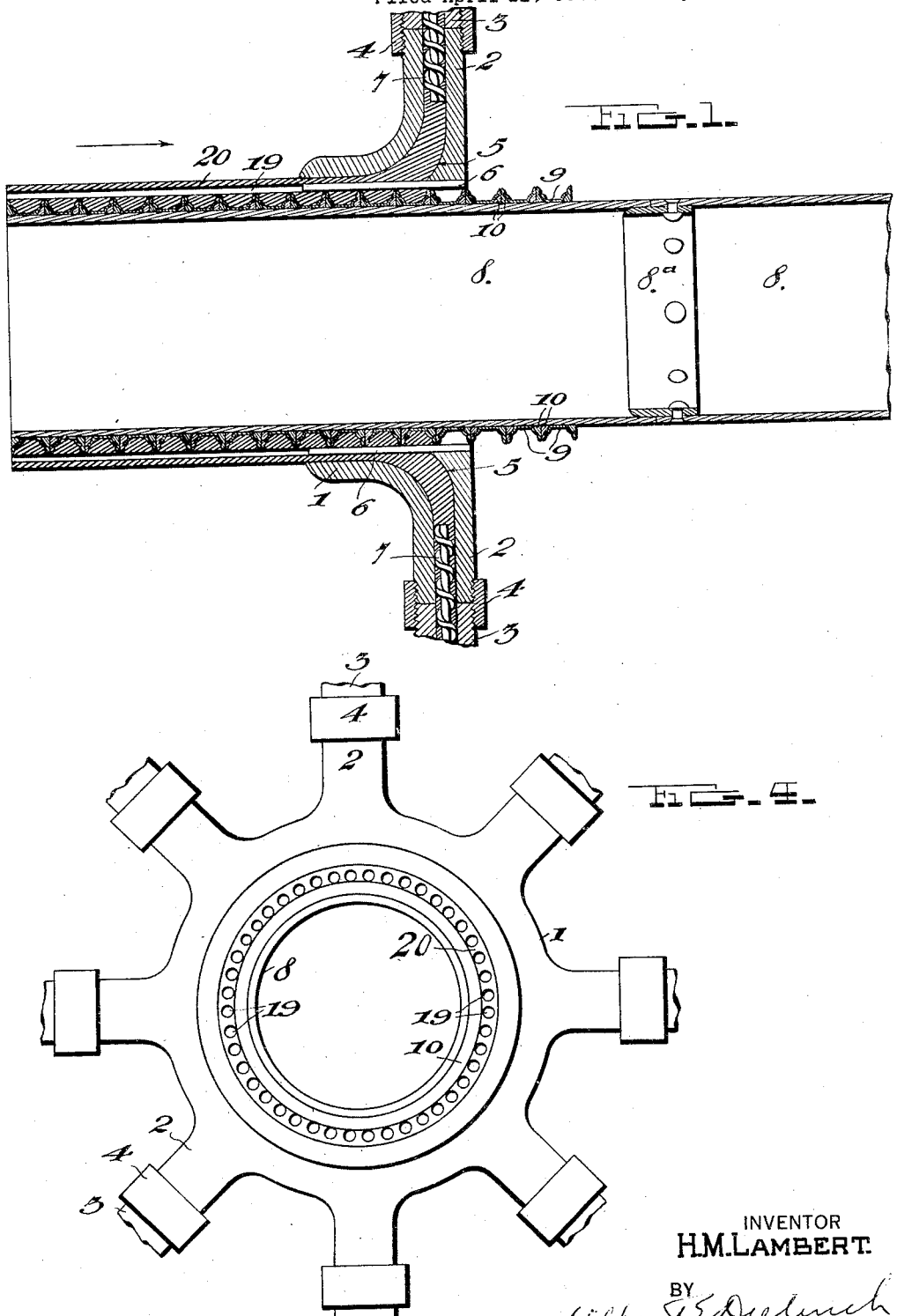

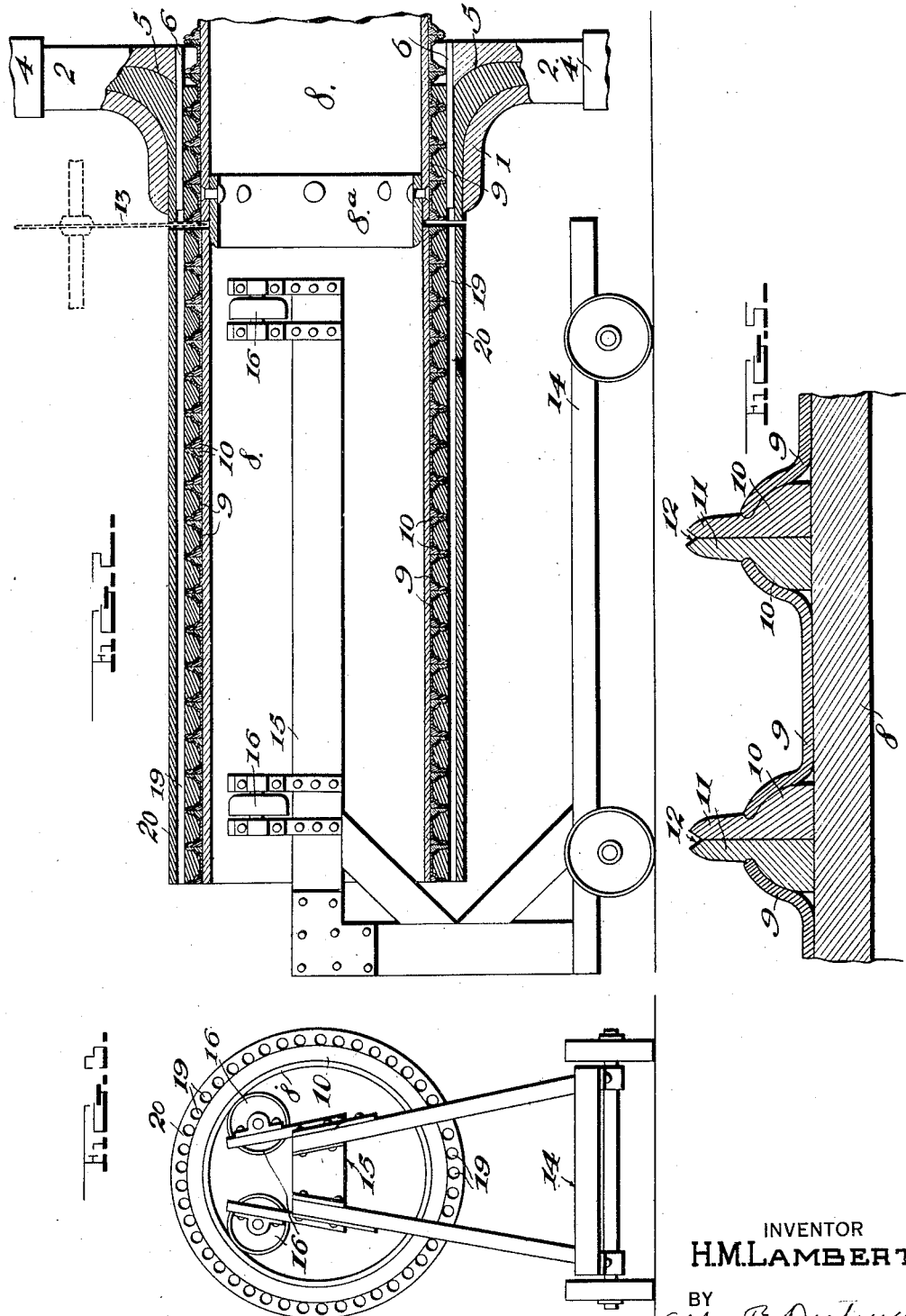

1,558,018

UNITED STATES PATENT OFFICE.

HENRY MILLER LAMBERT, OF PORTLAND, OREGON, ASSIGNOR TO LAMBERT TIRE & RUBBER CO., OF AKRON, OHIO, A CORPORATION OF ARIZONA.

APPARATUS FOR MAKING CUSHION TIRES.

Application filed April 11, 1924. Serial No. 705,928.

*To all whom it may concern:*

Be it known that I, HENRY M. LAMBERT, a citizen of the United States, residing at Portland, in the county of Multnomah and State of Oregon, have invented a new and Improved Apparatus for Making Cushion Tires, of which the following is a specification.

My invention has for its object to provide a new and improved apparatus for use in manufacturing cushion tires, an apparatus which is especially designed to carry out the method of manufacturing such tires which constitutes the subject matter of my co-pending application filed on even date herewith, Serial No. 705,929.

Generically the apparatus comprises a tubular die through which is a passageway for a mandril or pipe to pass, on which pipe the rims for the tires are placed and pass with the pipe through the die to receive the rubber issuing from the die; the die has provisions for expressing the rubber in the form of a seamless tube, in the inner surface of which the rims become embedded, the die also having pins to form holes in the expressed mass (when ventilated cushion tires are to be formed) which holes parallel the axes of the expressed tube and form the cross holes in the tire blank when it is cut from the mass.

The invention furthermore includes means to facilitate the cutting of the blanks and separation of the rims with their attached blanks from the mass of rubber issuing from the expressing die.

Again, the invention includes a carriage to receive the holder tube or mandril and its mass of rims and tire blank structure as they issue from the die and convey the same to a suitable cutter or cutting lathes by which the blanks are severed from the mass with their respective rims, to be ready for placement in shaping and vulcanizing molds by which the final form is given to the blank and the blank vulcanized as the finished tire.

In its more subordinate nature, the invention includes means for first advancing the mandril with the rims through the die, means conveniently handling the mandril in lengths of predetermined degree, and means for maintaining sufficient separation between adjacent rims to allow the required amount of lateral overhang of rubber that is necessary to be displaced to fill the cavities of the shaping and vulcanizing mold when the rim and blank are placed in the same and the mold is closed.

In its more specific nature, the invention includes those novel details of construction, combination and arrangement of parts, all of which will be first fully described, then be specifically pointed out in the appended claims, and illustrated in the accompanying drawings, in which:—

Figure 1 is a vertical longitudinal section of a die through which a mandril with rims is being passed to receive the seamless envelope of rubber as it issues from the die.

Figure 2 is a view similar to Figure 1 showing one mandril unit with its carriage parts detached from the following unit and mass and received on the carriage for conveyance to the cutters and lathe by which the individual sections of tire-blank are cut (the cutting lathe not being shown).

Figure 3 is an end view of the carriage with the mandril in place.

Figure 4 is an end view of the parts shown in Figure 1 taken in the direction of the arrow.

Figure 5 is an enlarged detail view of a portion of the mandril and several rims with rim spacer-rings.

Figure 6 is a detail cross section showing a rim with its tire-blank ready for the vulcanizing mold.

Figure 7 is a view of the blank shown in Figure 6 placed in an open mold.

Figure 8 is a view similar to Figure 7 with the mold closed.

Figure 9 is a view similar to Figure 6 showing the completed tire.

In the drawings, in which like numerals indicate like parts in all of the figures, 1 represents the die which is fed from one or more tube machines through nozzles 2 which are connected with the outlets 3 of the tube machines by unions 4, and into which nozzles 2 the material is fed and forced to the outlet of the die by suitable worms or screws 7, or other means for applying pressure.

The outlets of the die 1 are preferably forwardly curved as at 5 so that the issuing stream of material will have a tendency to carry with it the mandril and rim toward the outlet end of the die.

When cushion tires of the ventilated type are to be made the die is provided with an annular series of rods 6 which form the holes 19 in the tire carcass 20, but when solid cushion tires are to be made, the rods 6 are omitted.

8 designates the mandril which is preferably made in units or lengths adapted to be engaged by means of collar 8ª to assist alignment and feeding of the units, and which mandril unit 8 carries a series of rims 9 strung on it side by side with their axes substantially coincident, each rim 9 being separated from an adjacent rim by a pair of spacer-rings 10 that have projecting flanges 11 of suitable degree, and the abutting faces of the rings 10—10 are flat and lie in planes normal to the axes of the mandril, the edges of the abutting faces being bevelled as at 12 to facilitate entrance of the cutting and separating knife indicated diagrammatically in Figure 2, at 13.

14 is a carriage which has an arm 15 carrying rollers 16 to project into and receive a mandril unit 8 and, when the carcass 20 is severed by the knife 13, that unit may be carried away by the carriage 14 to a suitable lathe or cutter (not shown) in which the mandril unit is placed and by which the individual rim and tire-blank sections are severed one from another by cutting between the rims in the planes of the contacting faces of the spacer-rings 10.

In using my invention, the rubber from the tube machines is forced continuously through the die 1 and at the same time the mandril units 8 with their carried rims and spacer-rings are fed through the die 1. This feeding may be accomplished alone by the movement of the mass issuing from the die or it may be assisted by suitable mechanical or external pressures applied to the mandril to cause it to move in the direction of its axis forwardly, or the rims may be fitted loose enough on the mandril to slide along the same and the mandril may be held stationary, if desired, although the former practice is preferable.

After a mandril full of rims has been enveloped in the rubber sheathing or covering constituting the carcass 20, the carcass material is severed from the mass adjacent to the mouth of the die 1 by a suitable cutter, (see dotted lines Figure 2) and is then taken away on the carriage 14, after which the various units are separated by cutting the carcass 20 in planes normal to the axis of the mandril and between adjacent spacer-rings 10, thereby producing individual rim-tire-blank units, such as shown in Figure 6, which can then be placed in suitable vulcanizing molds to shape the mass and vulcanize the same into final form. Such molds as indicated in Figures 7, 8 and 9 may be employed. These molds consist of mating sections 17 carrying core pins 18 to enter the holes 19 in the tire-blank and maintain such holes while the rubber is being squeezed to deform it and cause it to fill the molding chamber.

From the foregoing description, taken in connection with the accompanying drawings, it is thought the complete construction, operation and advantages of my invention will be readily apparent to those skilled in the art.

What I claim is:

1. In tire making apparatus, a tubular die having provisions for expressing a seamless tube of rubber, and a mandril adapted to carry a series of rims thereon through the die to receive the envelope of rubber.

2. In tire making apparatus, a tubular die having provisions for expressing a seamless tube of rubber, a mandril adapted to carry a series of rims thereon through the die to receive the envelope of rubber, and means on the mandril for spacing the rims apart.

3. In tire making apparatus, a tubular die with provisions for expressing a seamless tube of rubber, duct forming rods carried by the die to form holes in the rubber tube which extend parallel to the axis thereof, and a mandril adapted to carry a series of rims thereon through the die.

4. In tire making apparatus, a tubular die with provisions for expressing a seamless tube of rubber, duct forming rods carried by the die to form holes in the rubber tube which extend parallel to the axis thereof, a mandril adapted to carry a series of rims thereon through the die, and means on the mandril for spacing the rims apart and supporting the rods as the mandril with the rims passes through the die.

5. The combination with a tubular rubber expressing die, of a rim carrying mandril adapted to be moved through said die to be enveloped in a tube of rubber expressed from the die.

6. The combination with a tubular rubber expressing die, of a rim carrying mandril adapted to be moved through said die to be enveloped in a tube of rubber expressed from the die, and means carried by the die to form a series of ducts in the envelope in parallelism with the axis of the envelope.

7. The combination with a tubular rubber expressing die, of a rim carrying mandril adapted to be moved through said die to be enveloped in a tube of rubber expressed from the die, said die adapted to issue the rubber in a direction longitudinally of the mandril thereby to tend to convey the mandril and rims carried on it through the die as the rim enveloping mass issues from the die.

8. The combination with a tubular rubber expressing die, of a rim carrying mandril adapted to be moved through said die to be enveloped in a tube of rubber expressed from the die, said die adapted to issue the rubber in a direction longitudinally of the mandril thereby to tend to convey the mandril and rims carried on it through the die as the rim enveloping mass issues from the die, and means carried by the die to form a series of ducts in the envelope paralleling the axis of the same.

9. In tire making apparatus, a mandril adapted to receive a series of rims, pairs of rim spacer rings on the mandril, said rings having parallel abutting faces with beveled edges for the purposes described.

10. In combination with a mandril to receive a series of tire rims, spacer rings between adjacent rims, said rings having parting surfaces.

11. In tire making apparatus, a die for expressing a seamless tube of rubber, said die having an axial passage, a mandril adapted to be passed through said passage and carry with it a series of tire rims to receive the tube of rubber on the same.

12. In tire making apparatus, the combination with a mandril to receive and carry a series of tire rims in juxtaposition, spacers between the rims on the mandril, and means for enveloping said rims and spacers in a sheath of rubber.

13. In tire making apparatus, a mandril adapted to carry a series of rims side by side, spacer rings on the mandril between adjacent rims, each of said spacer rings including abutting surfaces, the abutting surfaces of adjacent rings lying in contact in planes normal to the axis of the mandril and having their edges bevelled and projected beyond the edges of the rim, substantially as shown and described.

14. In tire making apparatus, a die having a central passage, means for forcing rubber through said die into said central passage, means for advancing a series of tire rims side by side through said passage with the axis of the rims substantially coincident with the axis of the passage whereby the rubber issuing from the die will be forced into the rims and envelope the same.

15. In tire making apparatus, means for holding a series of rims in juxtaposition side by side, and means for covering all of said rims with a continuous envelope of rubber, and means whereby said envelope of rubber may be severed in planes normal to the axes of the rims and between adjacent rims substantially as shown and for the purposes described.

HENRY MILLER LAMBERT.